United States Patent
Enomoto

(10) Patent No.: US 7,085,067 B2
(45) Date of Patent: Aug. 1, 2006

(54) ZOOM LENS SYSTEM

(75) Inventor: Takashi Enomoto, Chiba (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/996,469

(22) Filed: Nov. 26, 2004

(65) Prior Publication Data

US 2005/0111109 A1    May 26, 2005

(30) Foreign Application Priority Data

Nov. 26, 2003    (JP) .............................. 2003-395318

(51) Int. Cl.
*G02B 15/14*    (2006.01)
(52) U.S. Cl. ...................................... 359/680; 359/689
(58) Field of Classification Search ........ 359/680–682, 359/689, 691

See application file for complete search history.

(56) References Cited

U.S. PATENT DOCUMENTS

| | | | | |
|---|---|---|---|---|
| 5,381,269 A * | 1/1995 | Estelle | ......................... | 359/691 |
| 5,745,301 A * | 4/1998 | Betensky et al. | ............ | 359/689 |
| 5,875,059 A | 2/1999 | Estelle | ......................... | 359/682 |
| 6,124,984 A * | 9/2000 | Shibayama et al. | .......... | 359/689 |
| 6,515,805 B1 | 2/2003 | Hagimori | ..................... | 359/691 |
| 6,621,642 B1 | 9/2003 | Hagimori | ..................... | 359/682 |

FOREIGN PATENT DOCUMENTS

| | | |
|---|---|---|
| JP | 10-232349 | 9/1998 |
| JP | 2002-55278 | 2/2002 |
| JP | 2002-82284 | 3/2002 |

OTHER PUBLICATIONS

English Language Abstract of JP 10-232349.
English Language Abstract of JP 2002-55278.
English Language Abstract of JP 2002-82284.
U.S. Appl. No. 10/929,366 to Saori, filed Aug. 31, 2004.
U.S. Appl. No. 10/940,704 to Eguchi, filed Sep. 15, 2004.

* cited by examiner

*Primary Examiner*—Ricky Mack
*Assistant Examiner*—M. Hasan
(74) *Attorney, Agent, or Firm*—Greenblum & Bernstein, P.L.C.

(57)    ABSTRACT

A zoom lens system includes a negative first lens element, a positive second lens element and a positive third lens element, in this order from the object. Upon zooming from the short focal length extremity to the long focal length extremity, the positive second lens element and the positive third lens element move along the optical axis, while the negative first lens element remains stationary. Furthermore, the positive second lens element is directed to move from the image side toward the object side.

9 Claims, 8 Drawing Sheets

Fig. 3
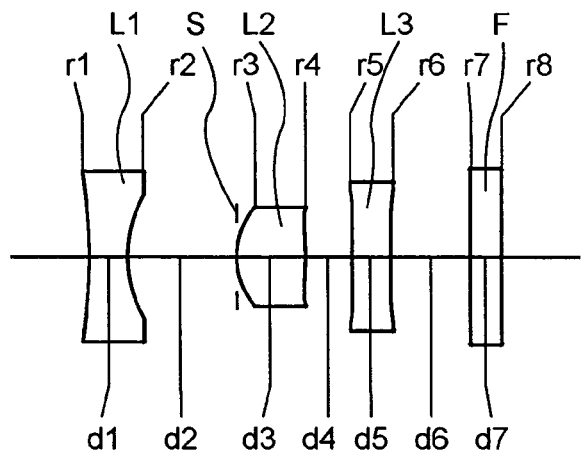
Fig. 4A
FNo.=1:2.8
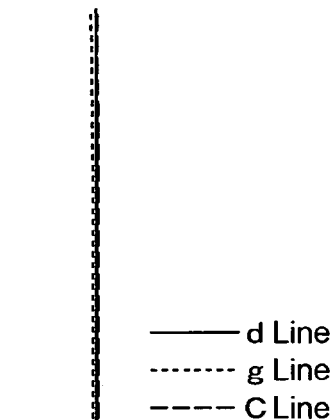
——— d Line
········ g Line
— — — C Line
-1.0  1.0
SPHERICAL
ABERRATION
CHROMATIC
ABERRATION
Fig. 4B
W=37.9°
-0.05  0.05
LATERAL
CHROMATIC
ABERRATION
Fig. 4C
W=37.9°
— S
-- M
-1.0  1.0
ASTIGMATISM
Fig. 4D
W=37.9°
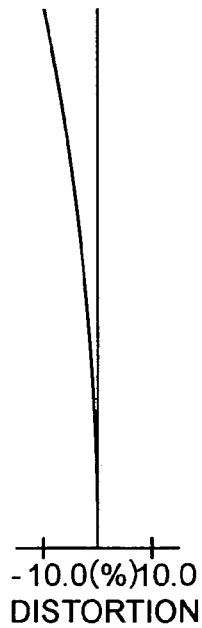
-10.0(%)10.0
DISTORTION FNo.=1:3.8

—— d Line
········ g Line
---- C Line
-1.0   1.0
SPHERICAL
ABERRATION

CHROMATIC
ABERRATION

W=19.0°

-0.05  0.05
LATERAL
CHROMATIC
ABERRATION

W=19.0°

—— S
-- M
-1.0   1.0
ASTIGMATISM

W=19.0°

-10.0 (%) 10.0
DISTORTION

FNo.=1:2.8

SPHERICAL
ABERRATION

CHROMATIC
ABERRATION

W=39.8°

LATERAL
CHROMATIC
ABERRATION

W=39.8°

ASTIGMATISM

W=39.8°

DISTORTION

FNo.=1:4.0  W=19.0°  W=19.0°  W=19.0°

SPHERICAL ABERRATION  LATERAL CHROMATIC ABERRATION  ASTIGMATISM  DISTORTION

CHROMATIC ABERRATION

FNo.=1:2.8

W=39.8°

W=39.8°

W=39.8°

——— d Line
------- g Line
- - - - C Line

——— S
- - M

-1.0   1.0
SPHERICAL
ABERRATION
CHROMATIC
ABERRATION

-0.05   0.05
LATERAL
CHROMATIC
ABERRATION

-1.0   1.0
ASTIGMATISM

-10.0(%)10.0
DISTORTION

FNo.=1:4.3

——— d Line
········ g Line
– – – C Line

-1.0  1.0
SPHERICAL
ABERRATION

CHROMATIC
ABERRATION

W=16.4°

-0.05  0.05
LATERAL
CHROMATIC
ABERRATION

W=16.4°

—— S
– – M

-1.0  1.0
ASTIGMATISM

W=16.4°

-10.0(%)10.0
DISTORTION

US 7,085,067 B2

ZOOM LENS SYSTEM

BACKGROUND OF THE INVENTION

1. Field of the Invention

The present invention relates to a zoom lens system which is mounted on a compact portable data handset, etc.

2. Description of the Prior Art

In recent years, a small digital camera module is provided in mobile phones and portable data handsets, e.g., a PDA (Personal Digital Assistants), etc. An optical system mounted on such a portable data handset has been increasingly required to attain further miniaturization and weight reduction. Currently, as the optical system mentioned above, there have been many optical systems in which (i) a single focal-length lens system is employed, and (ii) a digital-zooming function is provided so that the angle-of-view can be varied. Here, note that the digital-zooming function is to obtain a pseudo telephoto angle-of-view by trimming the periphery of the image plane. Moreover, as the optical system mentioned above, an optical zoom lens system (hereinafter, a zoom lens system) which has been made thinner in the optical axis direction has been proposed. As a specific example, a zoom lens system includes a first lens group having a negative refractive power (hereinafter, a negative first lens group) and a second lens group having a positive refractive power (hereinafter, a positive second lens group), in this order from the object. The angle-of-view is varied by changing the focal length thereof through the movement of the negative first lens group and the positive second lens group along the optical axis. Furthermore, there is a lens system in which a plurality of single focal-length lens systems are provided, and a single focal-length lens system is switched to another one in accordance with the desired magnification.

In the case where the zoom lens system of the two-lens-group arrangement mentioned above is employed in an apparatus such as a portable data handset which is required to be portable, operability of the apparatus is sacrificed since the lens groups are arranged to move in a forward direction or a backward direction along the optical axis upon zooming. If portability is more considered, an inner-zooming system would be preferable since no lens group is arranged to advance toward outside from an apparatus on which the zoom lens system is mounted.

On the other hand, in a lens system in which a single focal-length lens system out of a plurality of single focal-length lens systems is switched to another one in accordance with the desired magnification, spaces for storing the plural single focal-length lens systems have to be provided, and the manufacturing costs thereof increase; and still further, operability of the apparatus is sacrificed since a photographer has to change his/her posture every time the magnification is varied.

SUMMARY OF THE INVENTION

The present invention achieves a zoom lens system which can attain the following:

(i) further miniaturization;
(ii) manufacturing-cost reduction;
(iii) enhancement of operability of an apparatus such as a portable data handset when the zoom lens system is mounted thereon;
(iv) the half angle-of-view of about 40 degrees at the short focal length extremity; and
(v) the zoom ratio of about 2.

According to an aspect of the present invention, there is provided a zoom lens system including a negative first lens element, a positive second lens element and a positive third lens element, in this order from the object. Upon zooming from the short focal length extremity to the long focal length extremity, the positive second lens element and the positive third lens element move along the optical axis, while the negative first lens element remains stationary. Furthermore, the positive second lens element is directed to move from the image side toward the object side.

The zoom lens system of the present invention preferably satisfies the following condition:

$$0.8 < (d_{23W} - d_{23T})/f_W < 1.5 \quad (1)$$

wherein $f_W$ designates the focal length of the entire the zoom lens system at the short focal length extremity;

$d_{23W}$ designates the distance between the positive second lens element and the positive third lens element at the short focal length extremity; and $d_{23T}$ designates the distance between the positive second lens element and the positive third lens element at the long focal length extremity.

The zoom lens system of the present invention can satisfy the following condition:

$$0.6 < f_W/f_2 < 1.2 \quad (2)$$

wherein $f_W$ designates the focal length of the entire the zoom lens system at the short focal length extremity; and $f_2$ designates the focal length of the positive second lens element.

The zoom lens system of the present invention preferably satisfies the following condition:

$$-15 < R1_{L1}/f_W < -2 \quad (3)$$

wherein $R1_{L1}$ designates the radius of curvature of the most object-side surface of the negative first lens element; and $f_W$ designates the focal length of the entire the zoom lens system at the short focal length extremity.

The zoom lens system of the present invention can satisfy the following condition:

$$1.2 < f_{BW}/f_{BT} < 3.0 \quad (4)$$

wherein $f_{BW}$ designates the back focal distance (the equivalent air thickness) of the zoom lens system at the short focal length extremity; and $f_{BT}$ designates the back focal distance (the equivalent air thickness) of the zoom lens system at the long focal length extremity.

The zoom lens system of the present invention preferably satisfies the following condition:

$$0.1 < f_{BT}/f_W < 0.5 \quad (5)$$

wherein $f_{BT}$ designates the back focal distance (the equivalent air thickness) of the zoom lens system at the long focal length extremity; and $f_W$ designates the focal length of the entire the zoom lens system at the short focal length extremity.

The zoom lens system of the present invention can satisfy the following conditions:

$$vd1 > 50 \quad (6)$$

$$vd2 > 50 \quad (7)$$

$$vd3 > 50 \quad (8)$$

wherein vd1 designates the Abbe number of the negative first lens element;

vd2 designates the Abbe number of the positive second lens element; and vd3 designates the Abbe number of the positive third lens element.

In addition to the above, the following condition is preferably satisfied with respect to the positive second lens element:

$$vd2 > 60 \quad (7')$$

wherein vd2 designates the Abbe number of the positive second lens element.

The zoom lens system of the present invention preferably satisfies the following condition:

$$-0.8 < f_W/f_1 < -0.4 \quad (9)$$

wherein $f_W$ designates the focal length of the entire the zoom lens system at the short focal length extremity; and $f_1$ designates the focal length of the negative first lens element.

The zoom lens system of the present invention can satisfy the following condition:

$$0.05 < f_W/f_3 < 0.2 \quad (10)$$

wherein $f_W$ designates the focal length of the entire the zoom lens system at the short focal length extremity; and f3 designates the focal length of the positive third lens element.

The present disclosure relates to subject matter contained in Japanese Patent Application No. 2003-395318 (filed on Nov. 26, 2003) which is expressly incorporated herein in its entirety.

BRIEF DESCRIPTION OF THE DRAWINGS

The present invention will be discussed below in detail with reference to the accompanying drawings, in which:

FIG. 3 is a lens arrangement of the zoom lens system according to a first embodiment of the present invention;

FIGS. 4A, 4B, 4C and 4D show aberrations occurred in the lens arrangement of the first embodiment at the short focal length extremity;

DESCRIPTION OF THE PREFERRED EMBODIMENTS

Figure 1:
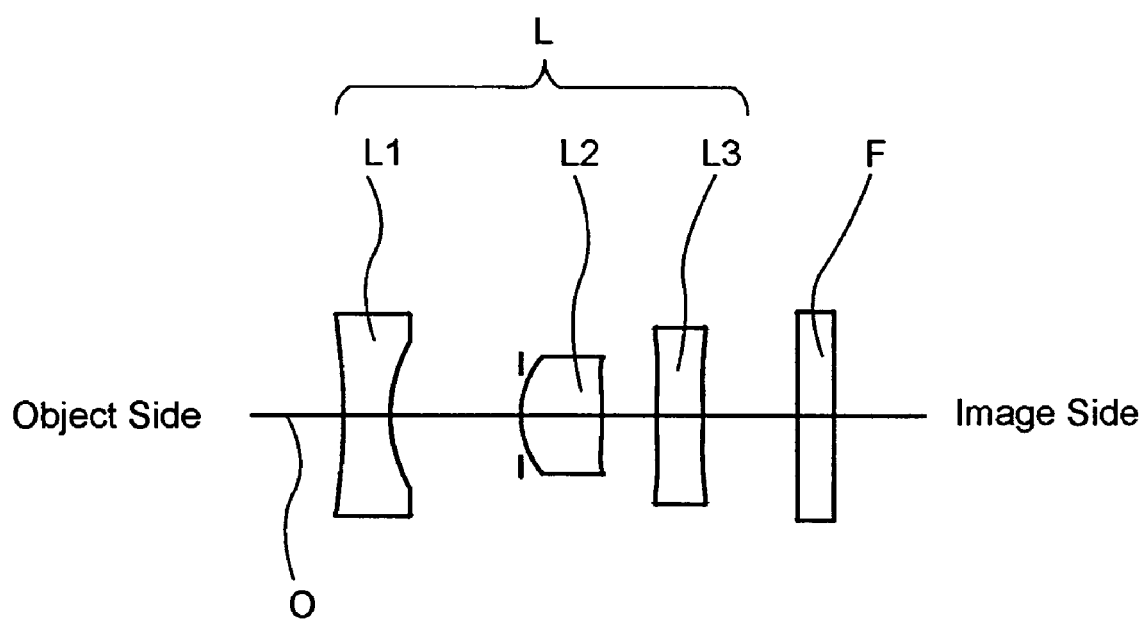
FIG. 1 shows a zoom lens system according to the present invention.

FIG. 1 shows the zoom lens system according to the present invention. The zoom lens system L is provided with a half angle-of-view of about 40 degrees at the short focal length extremity, and with a zoom ratio of about 2. The zoom lens system L of a three-lens element arrangement includes a negative first lens element L1, a positive second lens element L2, and a positive third lens element L3, in this order from the object. On the image-side of the zoom lens system L, a cover glass F (plane-parallel plate), such as an infrared absorption filter and so forth, is provided in front of the imaging device.

The negative first lens element L1 is a fixed lens element which is immovably supported in the zoom lens system. The positive second lens element L2 and the third lens element L3 are supported in the zoom lens system in a manner that these lens elements are arranged to move along the optical axis thereof. It is preferable that each of the negative first lens element L1, the positive second lens element L2 and the positive third lens element L3 be manufactured from plastic material in considering both cost and weight reduction of the zoom lens system, while it is of course possible to manufacture these lens elements from glass.

Figure 2:
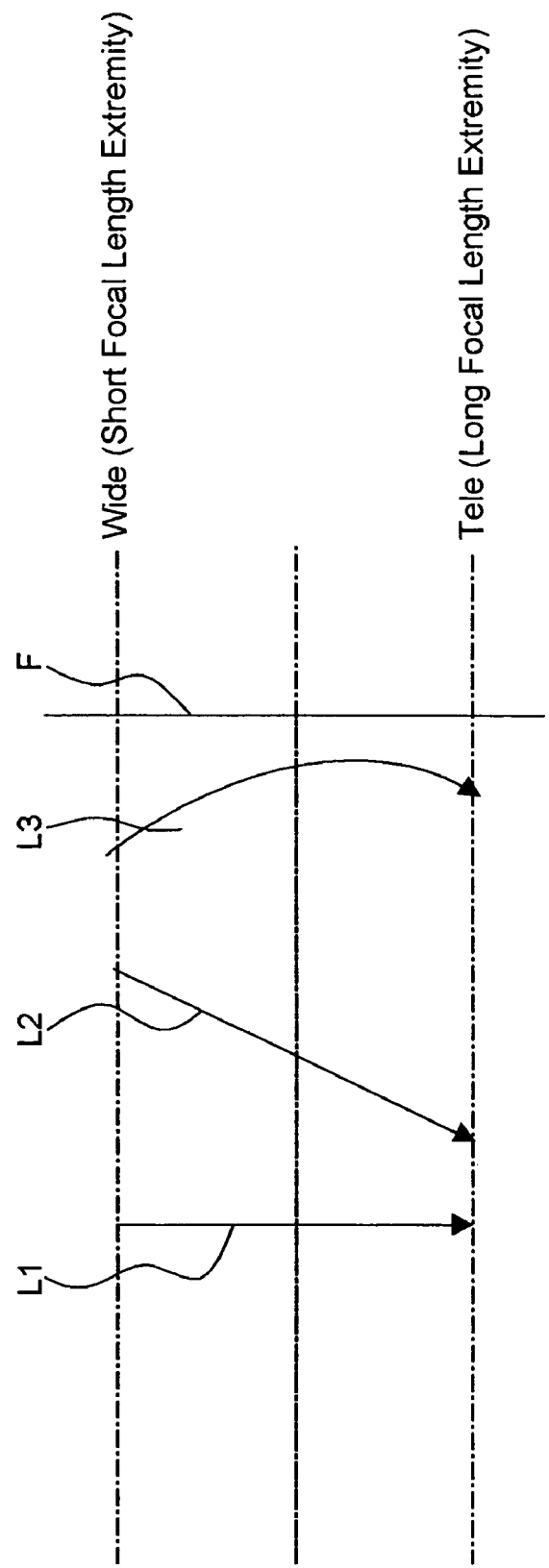
FIG. 2 is a schematic view of the lens-element moving paths for the zoom lens system of FIG. 1.
Figure 5A:
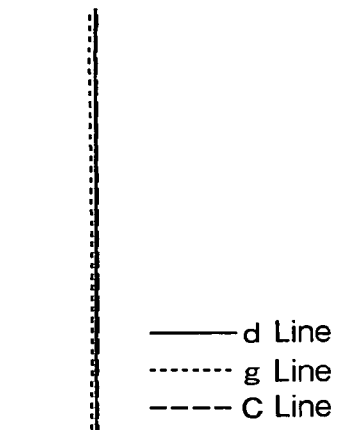
FIGS. 5A, 5B, 5C and 5D show aberrations occurred in the lens arrangement of the first embodiment at the long focal length extremity.
Figure 5B:
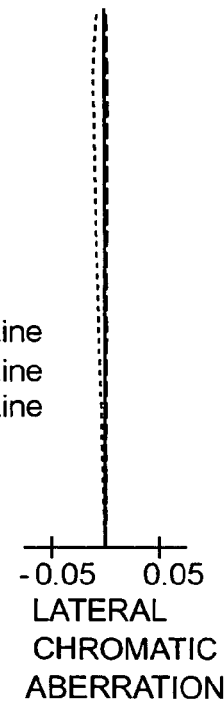
Figure 5C:
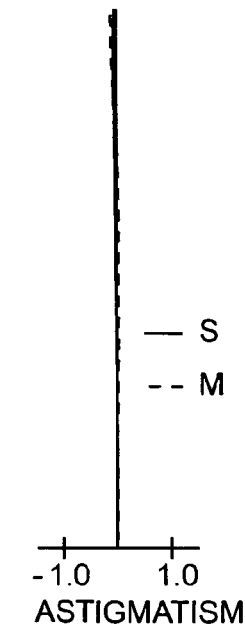
Figure 5D:
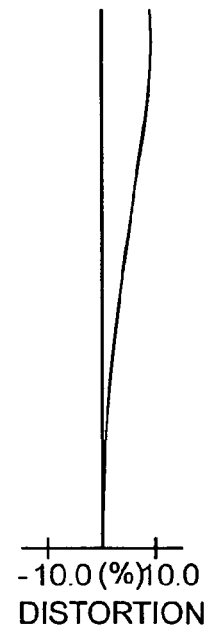

According to FIG. 2, i.e., the schematic view of the lens-element moving paths for the zoom lens system of FIG. 1, upon zooming from the short focal length extremity (wide-angle extremity) to the long focal length extremity (telephoto extremity), the positive second lens element L2 is directed to move monotonously toward the object, and the positive third lens element L3 moves toward the image and thereafter moves toward the object.

By moving the positive second lens element L2 and the positive third lens element L3 in such a manner, the focal length of the zoom lens system L can be changed continuously (in a stepless manner), while the negative first lens element L1 remains stationary.

Furthermore, in this zoom lens system L of the three-lens element arrangement, since the negative first lens element L1 remains stationary throughout the entire zooming range, the lens barrel which houses the zoom lens system L does not extend from an apparatus where the zoom lens system is mounted. According to such an arrangement, a zoom lens system having desirable operability is achieved. Still further, the zoom lens system L is constituted by three lens elements in total (i.e., the minimum number of lens elements), so that more cost reduction can be achieved, and there is no need to change a photographer's posture when photographing.

By controlling the positive second lens element L2 and the positive third lens element L3, upon zooming, so as to be able to stop at any position in the zooming range defined by the short focal length extremity and the long focal length extremity, the focal length of the zoom lens system L can be changed in a stepless manner.

Alternatively, by providing a plurality of stopping positions for the positive second lens element L2 and the positive third lens element L3, the focal length of the zoom lens system L can be changed in a stepwise manner so as to achieve a step-zoom lens system.

Condition (1) specifies the change in the distance between the positive second lens element L2 and the positive third lens element L3 with respect to the short focal length extremity and the long focal length extremity.

If $(d_{23W}-d_{23T})/f_W$ exceeds the upper limit of condition (1), the traveling distance of the positive second lens element L2 and that of the positive third lens element L3 become longer. Consequently, the overall size of the zoom lens system L becomes larger.

If $(d_{23W}-d_{23T})/f_W$ exceeds the lower limit of condition (1), the traveling distance of the positive second lens element L2 and that of the positive third lens element L3 become too short. Consequently, it becomes difficult to secure a zoom ratio of about 2.

By satisfying condition (1), a necessary zoom ratio can be secured without increasing the overall length of the zoom lens system L.

Condition (2) specifies the focal length (the refractive power) of the positive second lens element L2.

If $f_W/f_2$ exceeds the upper limit of condition (2), the focal length of the positive second lens element L2 becomes too short, i.e., the refractive power thereof becomes too strong. Consequently, the correcting of aberrations within the positive second lens element L2 becomes difficult.

If $f_W/f_2$ exceeds the lower limit of condition (2), the focal length of the positive second lens element L2 becomes longer, i.e., the refractive power thereof becomes weaker. Consequently, the traveling distance of the positive second lens element L2 becomes longer, and the overall size of the zoom lens system L becomes larger.

By satisfying condition (2), the traveling distance of the positive second lens element L2 can be appropriately made shorter, and the zoom lens system L can be miniaturized.

Condition (3) specifies the divergence of the most object-side surface (a first lens surface r1) of the negative first lens element L1.

If $R1_{L1}/f_W$ exceeds the upper limit of condition (3), the divergence effect of the first lens surface r1 of the negative first lens element L1 becomes smaller. Consequently, the collecting of peripheral illumination becomes difficult.

If $R1_{L1}/f_W$ exceeds the lower limit of condition (3), the radius of curvature of the first lens surface r1 of the negative first lens element L1 becomes too small. Consequently, machining of the negative first lens element L1 becomes difficult.

By satisfying condition (3), sufficient peripheral illumination can be collected without increasing the diameter of the negative first lens element L1 of the zoom lens system L even when the focal length of the zoom lens system L at the short focal length extremity is made shorter.

Condition (4) specifies the back focal distance of the zoom lens system L with respect to the short focal length extremity and the long focal length extremity.

If $f_{BW}/f_{BT}$ exceeds the upper limit of condition (4), telecentricity at the short focal length extremity largely differs from telecentricity at the long focal length extremity. As a result, telecentricity deteriorates at one of the short and long focal length extremities.

If $f_{BW}/f_{BT}$ exceeds the lower limit of condition (4), the traveling distance of the positive third lens element L3 becomes too short, which is disadvantageous for further miniaturization.

By satisfying condition (4), desirable telecentricity can be attained at both short and long focal length extremities; and at the same time, the traveling distance of the positive third lens element L3 can be secured, while further miniaturization of the zoom lens system L can be attained.

Condition (5) specifies the back focal distance at the long focal length extremity.

If $f_{BT}/f_W$ exceeds the upper limit of condition (5), the traveling distance of the positive third lens element L3 up to the long focal length extremity cannot be sufficiently secured. Consequently, the overall size of the zoom lens system L becomes larger.

If $f_{BT}/f_W$ exceeds the lower limit of condition (5), it is difficult to maintain telecentricity at the long focal length extremity.

By satisfying condition (5), telecentricity at the long focal length extremity can be adequately secured; and at the same time, the traveling distance of the positive third lens element L3 can be secured, and further miniaturization of the zoom lens system L can be attained.

Conditions (6), (7) and (8) specify the Abbe number for the negative first lens element L1, the positive second lens element L2 and the positive third lens element L3, respectively. Since the zoom lens system L is constituted by the three single lens elements, it is preferable that no chromatic aberration occur in each single lens element.

If the Abbe number exceeds the lower limits of conditions (6) through (8), the correcting of chromatic aberration at the long focal length extremity cannot be performed.

Condition (7') more strictly specifies the Abbe number of the positive second lens element L2.

It should be understood that the traveling distance of the positive second lens element L2 is longer than those of the negative first lens element L1 and the positive third lens element L3. Therefore the Abbe number of the positive second lens element L2 is preferably larger than those of the negative first lens element L1 and the positive third lens element L3.

Condition (9) specifies the focal length (the refractive power) of the negative first lens element L1.

If $f_W/f_1$ exceeds the upper limit of condition (9), the Petzval sum increases, and field curvature also increases.

If $f_W/f_1$ exceeds the lower limit of condition (9), the focal length of the negative first lens element L1 becomes too short, i.e., the refractive power thereof becomes too strong. Consequently, the correcting of aberrations occurred in the negative first lens element L1 by a smaller number of lens elements becomes difficult.

By satisfying condition (9), a suitable balance between field curvature and other aberrations can be achieved.

Condition (10) specifies the focal length (the refractive power) of the positive third lens element L3.

If $f_W/f_3$ exceeds the upper limit of condition (10), the focal length of the positive third lens element L3 becomes too short, i.e., the refractive power thereof becomes too strong. Consequently, the correcting of aberrations occurred in the positive third lens element L3 by a smaller number of lens elements becomes difficult.

If $f_W/f_3$ exceeds the lower limit of condition (10), the focal length of the positive third lens element L3 becomes longer, i.e., the refractive power thereof becomes weaker. Consequently, the traveling distance of the positive third lens group L3 becomes longer upon zooming, so that it is disadvantageous for further miniaturization of the zoom lens system L.

By satisfying condition (10), the traveling distance of the positive third lens element L3 can be made shorter; and at the same time, further miniaturization of the zoom lens system L can be achieved.

Specific numerical data of the embodiments will be described hereinafter.

In each embodiment, the zoom lens system L includes a negative first lens element L1 (surface Nos. 1 and 2), a diaphragm S, a positive second lens element L2 (surface Nos. 3 and 4), and a positive third lens element L3 (surface Nos. 5 and 6), in this order from the object.

A cover glass (plane-parallel plate (surface Nos. 7 and 8)) is provided behind the zoom lens system L.

In the diagrams of chromatic aberration (axial chromatic aberration) represented by spherical aberration, the solid line and the two types of dotted lines respectively indicate spherical aberrations with respect to the d, g and C lines. Also, in the diagrams of lateral chromatic aberration, the two types of dotted lines respectively indicate magnification with respect to the g and C lines; however, the d line as the base line coincides with the ordinate. In the diagrams of astigmatism, S designates the sagittal image, and M designates the meridional image.

In the tables, FNO designates the f-number, $f_W$ designates the focal length of the entire zoom lens system at the short focal length extremity, $f_T$ designates the focal length of the entire zoom lens system at the long focal length extremity, $f_{BW}$ designates the back focal distance (the equivalent air thickness) at short focal length extremity, $f_{BT}$ designates the back focal distance (the equivalent air thickness) at long focal length extremity, $f_1$ designates the focal length of the negative first lens element L1, $f_2$ designates the focal length of the positive second lens element L2, $f_3$ designates the focal length of the positive third lens element L3, W designates the half angle-of-view (°), r designates the radius of curvature, d designates the lens-element thickness or distance between lens elements, $N_d$ designates the refractive index of the d-line, and ν designates the Abbe number.

In addition to the above, an aspherical surface which is symmetrical with respect to the optical axis is defined as follows:

$$x = cy^2/(1+[1-\{1+K\}c^2y^2]^{1/2}) + A4y^4 + A6y^6 + A8y^8 + A10y^{10}$$

wherein:

c designates a curvature of the aspherical vertex (1/r);
y designates a distance from the optical axis;
K designates the conic coefficient; and
A4 designates a fourth-order aspherical coefficient;
A6 designates a sixth-order aspherical coefficient;
A8 designates a eighth-order aspherical coefficient; and
A10 designates a tenth-order aspherical coefficient.

Embodiment 1

FIG. 3 is the lens arrangement of the zoom lens system according to the first embodiment of the present invention. FIGS. 4A through 4D show aberrations occurred in the lens arrangement of the first embodiment at the short focal length extremity. FIGS. 5A through 5D show aberrations occurred in the lens arrangement of the first embodiment at the long focal length extremity. Table 1 shows the numerical data of the first embodiment. The values of $F_{NO.}$ and W are shown in the order of the short focal length extremity and the long focal length extremity. Likewise, the values of d with respect to surface Nos. 2, 4 and 6 are shown in the order of the short focal length extremity and the long focal length extremity.

The diaphragm S is provided 2.81 mm behind surface No. 2 at the short focal length extremity, and 0.70 mm behind surface No. 2 at the long focal length extremity.

TABLE 1

| $F_{NO.}$ = 1:2.8–3.8 | | | |
|---|---|---|---|
| $f_W$ = 3.20 | | | |
| $f_T$ = 6.00 | | | |
| $f_{BW}$ = 2.05 + 0.8/1.51633 = 2.58 | | | |
| $f_{BT}$ = 0.52 + 0.8/1.51633 = 1.05 | | | |
| $f_1$ = −5.13 | | | |
| $f_2$ = 3.43 | | | |
| $f_3$ = 25.95 | | | |
| W = 37.9–19.0 | | | |

| Surf. No. | r | d | Nd | νd |
|---|---|---|---|---|
| 1* | −12.149 | 1.00 | 1.49176 | 57.4 |
| 2 | 3.273 | 2.81–0.70 | — | — |
| 3* | 1.943 | 1.77 | 1.48749 | 70.2 |
| 4* | −8.390 | 1.20–4.84 | — | — |
| 5* | 28.031 | 1.00 | 1.49176 | 57.4 |
| 6* | −23.146 | 2.05–0.52 | — | — |
| 7 | ∞ | 0.80 | 1.51633 | 64.1 |
| 8 | ∞ | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 1 | 0.00 | 0.80890 × 10⁻³ | 0.18554 × 10⁻³ | −0.25309 × 10⁻⁴ |
| 3 | 0.00 | −0.88931 × 10⁻² | 0.22701 × 10⁻² | — |
| 4 | 0.00 | 0.19638 × 10⁻¹ | — | 0.81377 × 10⁻² |
| 5 | 0.00 | −0.64072 × 10⁻² | — | −0.48617 × 10⁻³ |
| 6 | 0.00 | 0.19293 × 10⁻¹ | — | −0.60999 × 10⁻³ |

Embodiment 2

Figure 6:
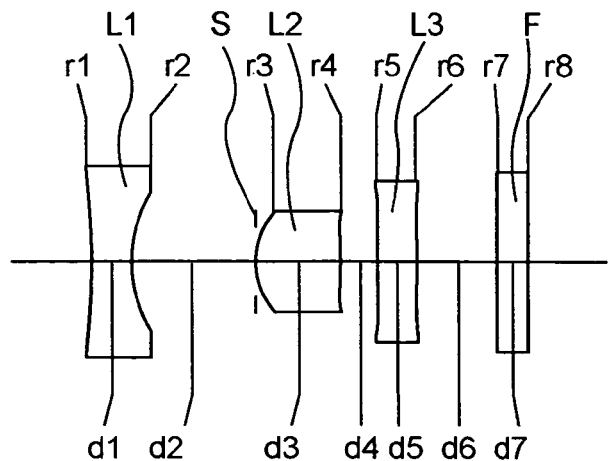
FIG. 6 is a lens arrangement of the zoom lens system according to a second embodiment of the present invention.
Figure 7A:
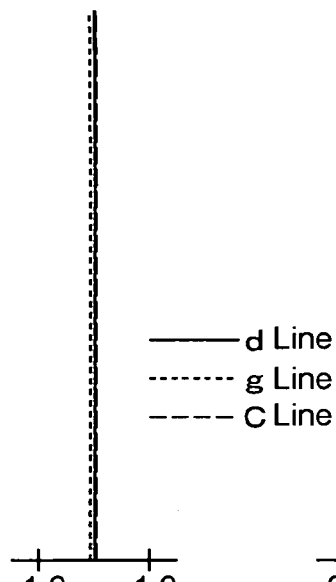
FIGS. 7A, 7B, 7C and 7D show aberrations occurred in the lens arrangement of the second embodiment at the short focal length extremity.
Figure 7B:
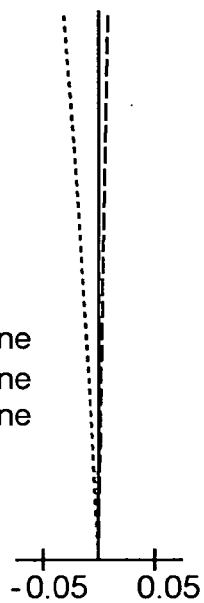
Figure 7C:
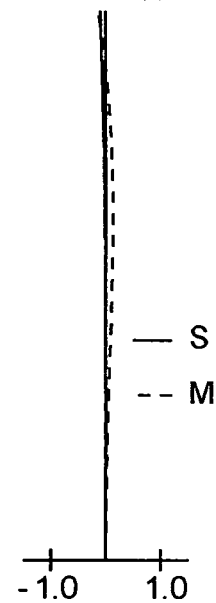
Figure 7D:
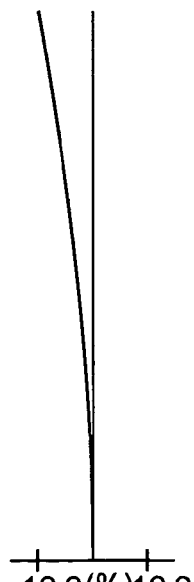
Figure 8A:
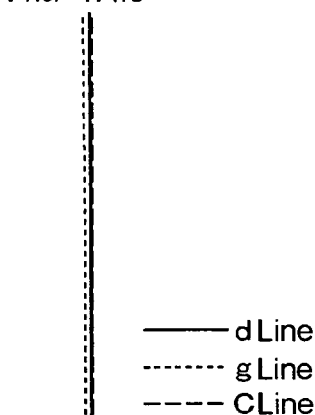
FIGS. 8A, 8B, 8C and 8D show aberrations occurred in the lens arrangement of the second embodiment at the long focal length extremity.
Figure 8B:
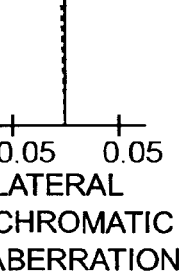
Figure 8C:
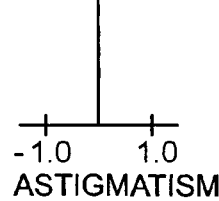
Figure 8D:
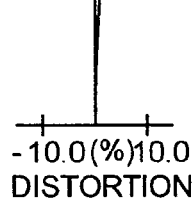

FIG. 6 is the lens arrangement of the zoom lens system according to the second embodiment of the present invention. FIGS. 7A through 7D show aberrations occurred in the lens arrangement of the second embodiment at the short focal length extremity. FIGS. 8A through 8D show aberrations occurred in the lens arrangement of the second embodiment at the long focal length extremity. Table 2 shows the numerical data of the second embodiment. The values of $F_{NO.}$ and W are shown in the order of the short focal length extremity and the long focal length extremity. Likewise, the values of d with respect to surface Nos. 2, 4 and 6 are shown in the order of the short focal length extremity and the long focal length extremity.

The diaphragm S is provided 3.15 mm behind surface No. 2 at the short focal length extremity, and 0.80 mm behind surface No. 2 at the long focal length extremity.

TABLE 2

| $F_{NO.}$ = 1:2.8–4.0 |
|---|
| $f_W$ = 3.00 |
| $f_T$ = 6.00 |
| $f_{BW}$ = 2.02 + 0.8/1.51633 = 2.55 |
| $f_{BT}$ = 0.46 + 0.8/1.51633 = 0.99 |
| $f_1$ = −5.29 |
| $f_2$ = 3.53 |

TABLE 2-continued $f_3 = 17.95$
$W = 39.8–19.0$

| Surf. No. | r | d | Nd | νd |
|---|---|---|---|---|
| 1* | −15.418 | 1.00 | 1.51633 | 64.1 |
| 2 | 3.392 | 3.15–0.80 | — | — |
| 3* | 1.925 | 2.10 | 1.48749 | 70.2 |
| 4* | −10.515 | 0.93–4.83 | — | — |
| 5* | 36.745 | 1.00 | 1.51633 | 64.1 |
| 6* | −11.561 | 2.02–0.46 | — | — |
| 7 | ∞ | 0.80 | 1.51633 | 64.1 |
| 8 | ∞ | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 1 | 0.00 | $0.89531 \times 10^{-3}$ | $0.18897 \times 10^{-3}$ | $-0.19631 \times 10^{-4}$ |
| 3 | 0.00 | $-0.89456 \times 10^{-2}$ | $0.58296 \times 10^{-4}$ | — |
| 4 | 0.00 | $0.20873 \times 10^{-1}$ | — | $0.67586 \times 10^{-2}$ |
| 5 | 0.00 | $-0.36619 \times 10^{-2}$ | — | $-0.30000 \times 10^{-3}$ |
| 6 | 0.00 | $0.19001 \times 10^{-1}$ | — | $-0.46000 \times 10^{-3}$ |

Embodiment 3

Figures 9, 10A, 10B, 10C, 10D:
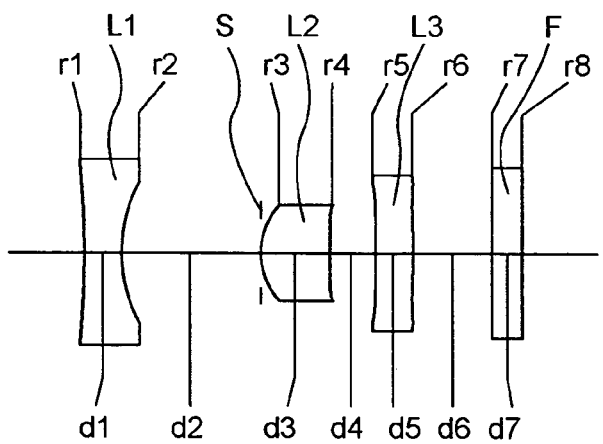
FIG. 9 is a lens arrangement of the zoom lens system according to a third embodiment of the present invention.
FIGS. 10A, 10B, 10C and 10D show aberrations occurred in the lens arrangement of the third embodiment at the short focal length extremity.
Figure 11A:
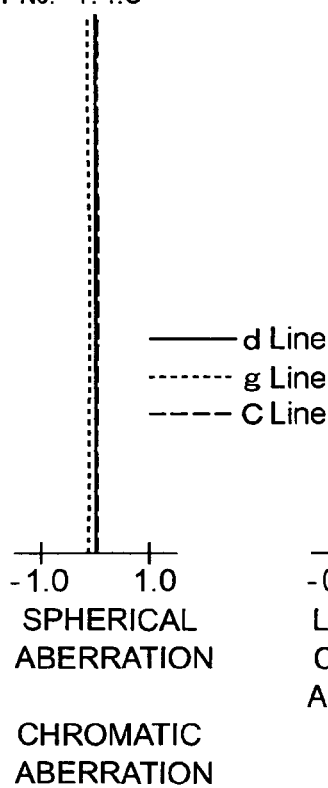
FIGS. 11A, 11B, 11C and 11D show aberrations occurred in the lens arrangement of the third embodiment at the long focal length extremity.
Figure 11B:
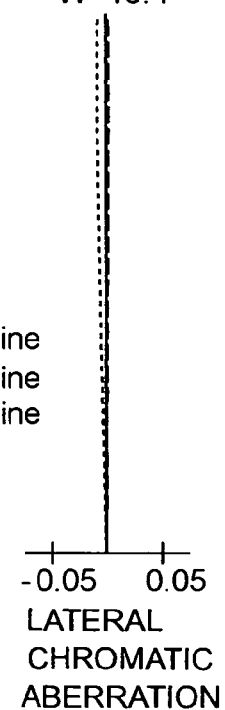
Figure 11C:
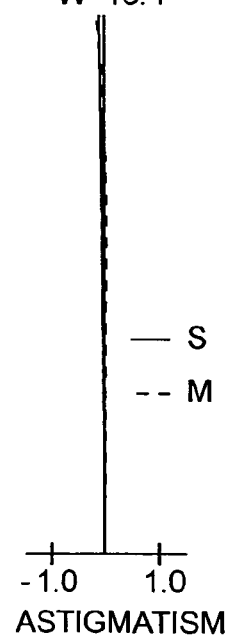
Figure 11D:
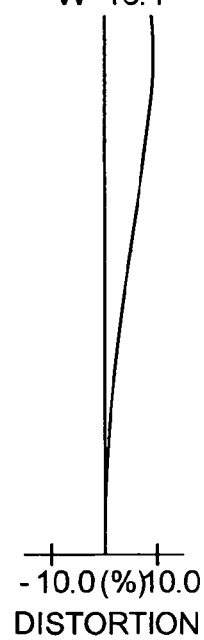

FIG. 9 is the lens arrangement of the zoom lens system according to the third embodiment of the present invention. FIGS. 10A through 10D show aberrations occurred in the lens arrangement of the third embodiment at the short focal length extremity. FIGS. 11A through 11D show aberrations occurred in the lens arrangement of the third embodiment at the long focal length extremity. Table 3 shows the numerical data of the third embodiment. The values of $F_{NO.}$ and W are shown in the order of the short focal length extremity and the long focal length extremity. Likewise, the values of d with respect to surface Nos. 2, 4 and 6 are shown in the order of the short focal length extremity and the long focal length extremity.

The diaphragm S is provided 3.69 mm behind surface No. 2 at the short focal length extremity, and 0.70 mm behind surface No. 2 at the long focal length extremity.

TABLE 3

$F_{NO.} = 1:2.8–4.3$
$f_W = 3.00$
$f_T = 7.00$
$f_{BW} = 2.11 + 0.8/1.51633 = 2.64$
$f_{BT} = 0.43 + 0.8/1.51633 = 0.96$
$f_1 = -5.36$
$f_2 = 3.64$
$f_3 = 19.58$
$W = 39.8–16.4$

| Surf. No. | r | d | Nd | νd |
|---|---|---|---|---|
| 1* | −21.718 | 1.00 | 1.61800 | 63.4 |
| 2 | 3.977 | 3.69–0.70 | — | — |
| 3* | 1.939 | 1.83 | 1.48749 | 70.2 |
| 4* | −14.602 | 1.22–5.88 | — | — |
| 5* | −154.228 | 1.00 | 1.61800 | 63.4 |
| 6* | −11.248 | 2.11–0.43 | — | — |
| 7 | ∞ | 0.80 | 1.51633 | 64.1 |
| 8 | ∞ | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 1 | 0.00 | $0.46683 \times 10^{-3}$ | $0.14951 \times 10^{-3}$ | $-0.16082 \times 10^{-4}$ |
| 3 | 0.00 | $-0.67578 \times 10^{-2}$ | $0.14410 \times 10^{-2}$ | — |
| 4 | 0.00 | $0.23576 \times 10^{-1}$ | — | $0.82065 \times 10^{-2}$ |
| 5 | 0.00 | $-0.18860 \times 10^{-2}$ | — | $-0.30000 \times 10^{-3}$ |
| 6 | 0.00 | $0.17506 \times 10^{-1}$ | — | $-0.46000 \times 10^{-3}$ |

The numerical values of each condition of each embodiment are shown in Table 4.

TABLE 4

| | Embod. 1 | Embod. 2 | Embod. 3 |
|---|---|---|---|
| Condition (1) | 1.14 | 1.21 | 1.21 |
| Condition (2) | 0.93 | 0.85 | 0.82 |
| Condition (3) | −3.80 | −5.14 | −7.24 |
| Condition (4) | 2.47 | 2.57 | 2.74 |
| Condition (5) | 0.33 | 0.33 | 0.32 |
| Condition (6) | 57.5 | 64.2 | 63.4 |
| Condition (7) | 70.2 | 70.2 | 70.2 |
| Condition (8) | 57.5 | 64.2 | 63.4 |
| Condition (7') | 70.2 | 70.2 | 70.2 |
| Condition (9) | −0.62 | −0.57 | −0.56 |
| Condition (10) | 0.12 | 0.17 | 0.15 |

As can be understood from Table 4, the numerical values of the first through third embodiments satisfy conditions (1) through (10) and condition (7'). Furthermore, the aberrations are adequately corrected at each focal length.

According to the present invention, the zoom lens system includes a negative first lens element which is immovably fixed, a positive second lens element and a positive third which are movable along the optical axis, in this order from the object; thereby, zooming is performed by moving the positive second lens element and the positive third lens element, while the negative first lens element remains stationary. In other words, upon zooming, no lens element is arranged to advance toward outside from an apparatus on which the zoom lens system is mounted, i.e., an inner-zooming system can be attained. Due to this arrangement, the zoom lens system of the present invention can attain the following:

(i) enhancement of operability of an apparatus on which the zoom lens system of the present invention is mounted;

(ii) the half angle-of-view of about 40 degrees at the short focal length extremity; and (iii) the zoom ratio of about 2.

Furthermore, since the zoom lens system of the present invention is constituted by a smaller number of lens elements, more cost reduction can be achieved; and there is no need to change a photographer's posture when photographing, compared with a zoom lens system in which a plurality of single focal-length lens systems are provided, and a single focal-length lens system is switched to another one in accordance with the desired magnification.

What is claimed is:

1. A zoom lens system comprising a negative first lens element, a positive second lens element and a positive third lens element, in this order from an object, wherein upon zooming from the short focal length extremity to the long focal length extremity, said positive second lens element and said positive third lens element move along an optical axis, while said negative first lens element remains stationary;

wherein said positive second lens element is directed to move from the image side toward the object; and wherein the zoom lens system satisfies the following condition:

$$0.8 < (d_{23W} - d_{23T})/f_W < 1.5$$

wherein $f_W$ designates the focal length of the entire the zoom lens system at the short focal length extremity;

$d_{23W}$ designates the distance between said positive second lens element and said positive third lens element at the short focal length extremity; and $d_{23T}$ designates the distance between said positive second lens element and said positive third lens element at the long focal length extremity.

2. A zoom lens system comprising a negative first lens element, a positive second lens element and a positive third lens element, in this order from an object, wherein upon zooming from the short focal length extremity to the long focal length extremity, said positive second lens element and said positive third lens element move along an optical axis, while said negative first lens element remains stationary;

wherein said positive second lens element is directed to move from the image side toward the object side; and wherein the zoom lens system satisfies the following condition;

$$0.6 < f_W/f_2 < 1.2$$

wherein $f_W$ designates the focal length of the entire the zoom lens system at the short focal length extremity; and $f_2$ designates the focal length of said positive second lens element.

3. A zoom lens system comprising a negative first lens element, a positive second lens element and a positive third lens element, in this order from an object, wherein upon zooming from the short focal length extremity to the long focal length extremity, said positive second lens element and said positive third lens element move along an optical axis, while said negative first lens element remains stationary;

wherein said positive second lens element is directed to move from the image side toward the object side; and wherein the zoom lens system satisfies the following condition;

$$-15 < R1_{L1}/f_W < -2$$

wherein $R1_{L1}$ designates the radius of curvature of the most object-side surface of said negative first lens element; and $f_W$ designates the focal length of the entire the zoom lens system at the short focal length extremity.

4. A zoom lens system comprising a negative first lens element, a positive second lens element and a positive third lens element, in this order from an object, wherein upon zooming from the short focal length extremity to the long focal length extremity, said positive second lens element and said positive third lens element move alone an optical axis, while said negative first lens element remains stationary;

wherein said positive second lens element is directed to move from the image side toward the object side; and wherein the zoom lens system satisfies the following condition;

$$1.2 < f_{BW}/f_{BT} < 3.0$$

wherein $f_{BW}$ designates the back focal distance (the equivalent air thickness) of the zoom lens system at the short focal length extremity; and $f_{BT}$ designates the back focal distance (the equivalent air thickness) of the zoom lens system at the long focal length extremity.

5. A zoom lens system comprising a negative first lens element, a positive second lens element and a positive third lens element, in this order from an object, wherein upon zooming from the short focal length extremity to the long focal length extremity, said positive second lens element and said positive third lens element move along an optical axis, while said negative first lens element remains stationary;

wherein said positive second lens element is directed to move from the image side toward the object side; and wherein the zoom lens system satisfies the following condition;

$$0.1 < f_{BT}/f_W < 0.5$$

wherein $f_{BT}$ designates the back focal distance (the equivalent air thickness) of the zoom lens system at the long focal length extremity; and $f_W$ designates the focal length of the entire the zoom lens system at the short focal length extremity.

6. A zoom lens system comprising a negative first lens element, a positive second lens element and a positive third lens element, in this order from an object, wherein upon zooming from the short focal length extremity to the long focal length extremity, said positive second lens element and said positive third lens element move along an optical axis, while said negative first lens element remains stationary:

wherein said positive second lens element is directed to move from the image side toward the object side; and wherein the zoom lens system satisfies the following conditions;

vd1>50
vd2>50
vd3>50 wherein vd1 designates the Abbe number of said negative first lens element vd2 designates the Abbe number of said positive second lens element; and vd3 designates the Abbe number of said positive third lens element.

7. A zoom lens system comprising a negative first lens element, a positive second lens element and a positive third lens element, in this order from an object, wherein upon zooming from the short focal length extremity to the long focal length extremity, said positive second lens element and said positive third lens element move along an optical axis, while said negative first lens element remains stationary;

wherein said positive second lens element is directed to move from the image side toward the object side; and wherein the zoom lens system satisfies the following condition;

vd2<60 wherein vd2 designates the Abbe number of said positive second lens element.

8. A zoom lens system comprising a negative first lens element, a positive second lens element and a positive third lens element, in this order from an object, wherein upon zooming from the short focal length extremity to the long focal length extremity, said positive second lens element and said positive third lens element move along an optical axis, while said negative first lens element remains stationary;

wherein said positive second lens element is directed to move from the image side toward the object side; and wherein the zoom lens system satisfies the following condition;

$-0.8<f_W/f_1<-0.4$ wherein $f_W$ designates the focal length of the entire the zoom lens system at the short focal length extremity; and $f_1$ designates the focal length of said negative first lens element.

9. A zoom lens system comprising a negative first lens element, a positive second lens element and a positive third lens element, in this order from an object, wherein upon zooming from the short focal length extremity to the long focal length extremity, said positive second lens element and said positive third lens element move along an optical axis, while said negative first lens element remains stationary;

wherein said positive second lens element is directed to move from the image side toward the object side; and wherein the zoom lens system satisfies the following condition:

$0.05<f_W/f_3<0.2$ wherein $f_W$ designates the focal length of the entire the zoom lens system at the short focal length extremity; and f3 designates the focal length of said positive third lens element.

* * * * *